United States Patent [19]

Kühnelt et al.

[11] 4,027,744

[45] June 7, 1977

[54] PNEUMATIC PULSE HYDRAULIC CONTROLLED VALVE FOR CONTROLLING A LUBRICATING DEVICE

[75] Inventors: Herbert Kühnelt; Rudolf Huber, both of Vienna, Austria

[73] Assignee: Hoerbiger Fluidtechnik KG, Vienna, Austria

[22] Filed: Apr. 23, 1976

[21] Appl. No.: 679,878

[30] Foreign Application Priority Data

Apr. 25, 1975 Austria .............................. 3209/75

[52] U.S. Cl. .................. 184/7 F; 60/544; 137/624.13; 251/63.4
[51] Int. Cl.² ........................................ F01M 1/06
[58] Field of Search ............... 184/7, 76, 70, 7 E, 184/7 F; 60/544; 137/624.13, 624.14, 624.15; 251/63.4

[56] References Cited

UNITED STATES PATENTS

| | | | |
|---|---|---|---|
| 1,760,902 | 6/1930 | Grattan | 137/624.13 |
| 2,011,864 | 8/1935 | Lundh | 60/544 |
| 2,041,023 | 5/1936 | Roberts | 184/7 E |
| 2,047,832 | 7/1936 | Morton | 137/624.14 |
| 3,119,592 | 1/1964 | Fraschetti | 251/63.4 |

Primary Examiner—Samuel Feinberg
Attorney, Agent, or Firm—Spencer & Kaye

[57] ABSTRACT

In apparatus for controlling a lubricating device which is actuated by pulses of compressed air, the apparatus including a drive piston disposed in a cylinder to undergo reciprocating movement under the action of each such pulse and a control valve disposed between the source of such pulses and the lubricating device, the control valve is periodically opened to permit one such compressed air pulse to be delivered to the lubricating device only after a predetermined number of compressed air pulses have been produced, by means of a stepping mechanism which includes a reciprocating pump connected to be driven by the drive piston to supply, in response to each cycle of movement of the drive piston, a predetermined quantity of liquid, an actuating cylinder containing an actuating piston and arranged to receive each such quantity of liquid to move the piston in a unidirectional, step-wise manner so that the actuating piston advances through the cylinder in discrete steps as a series of quantities of liquid are supplied by the pump, and an actuating member disposed between the control valve and the actuating piston to open the control valve when the piston reaches a selected location along the length of the actuating cylinder. After the control valve has been opened, the pulse of compressed air being delivered to the system is also conveyed to the actuating cylinder to drive the actuating piston back to its starting position and upon termination of the compressed air pulse, the control valve automatically closes.

14 Claims, 2 Drawing Figures

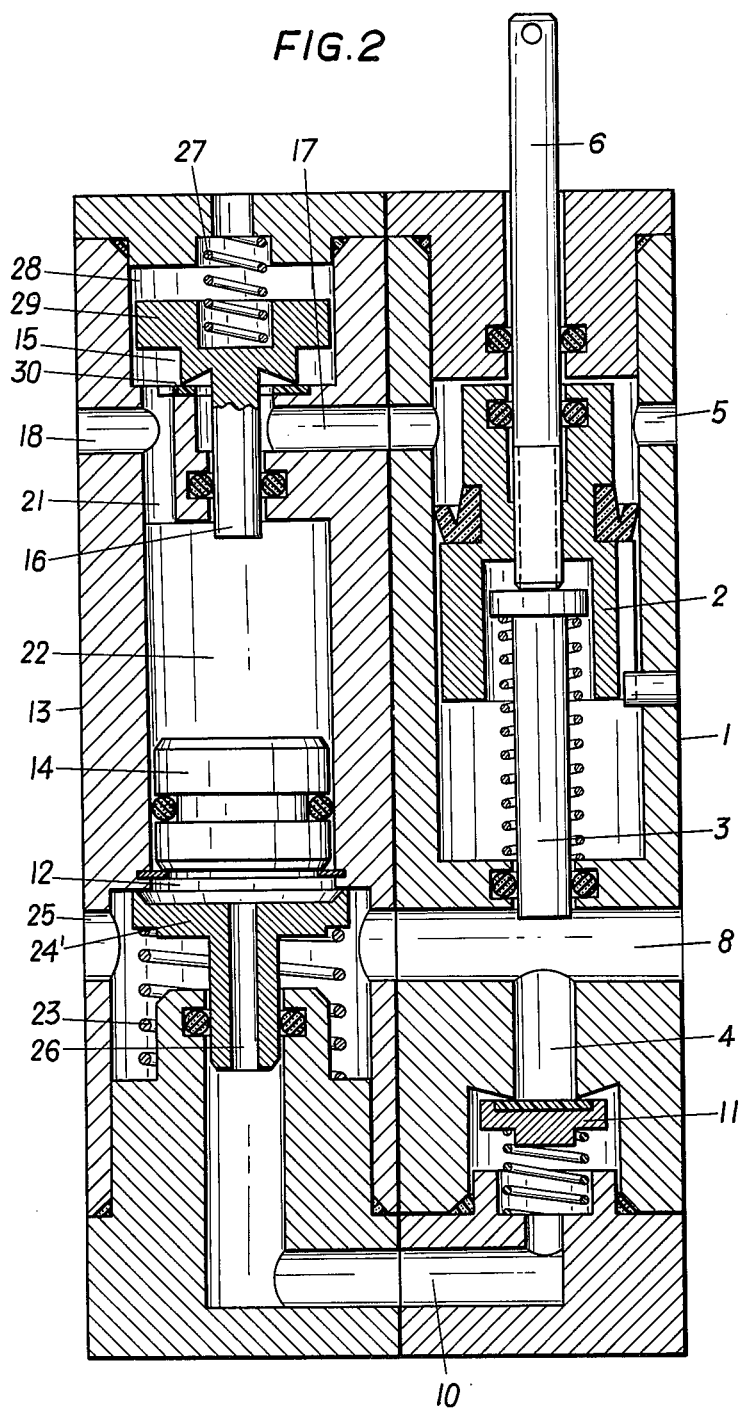

PNEUMATIC PULSE HYDRAULIC CONTROLLED VALVE FOR CONTROLLING A LUBRICATING DEVICE

BACKGROUND OF THE INVENTION

The invention relates to apparatus for controlling lubricating devices which are actuated by pulses of compressed air, and particularly to apparatus of the type which includes a drive piston which is moved back and forth, in synchronism with the actuation of the devices to be lubricated, by the compressed air provided for these devices, whereby the drive piston actuates a control valve for the introduction of pulses of compressed air to the lubricating devices.

It is known to lubricate machine parts and pneumatically actuated devices by means of a lubricating device which is driven by pulses of compressed air which drives the lubricating device in synchronism with the devices to be lubricated. With such a lubricating device, which includes, for example, an oil pump with series-connected metering elements, or is a directly pneumatically actuated oil gun, a certain minimum quantity discharge takes place with every actuation pulse. In various cases, for example when lubricating small pneumatic cylinders or devices operating at a high operating frequency, too much lubricant is discharged.

It is known to overcome such a drawback by connecting a monitoring device ahead of the lubricating device, the monitoring device causing an actuation or operating signal to be transmitted to the associated lubricating device only after the occurrence of a certain number of switch-on periods of the device to be lubricated.

In a known monitoring device of this type, one example of which is disclosed in German Pat. No. 1,775,703, a drive piston is provided which is moved back and forth by the switch-on pulses of the device to be lubricated and the drive piston is provided with a piston rod which engages, through the intermediary of a transverse pin, in an oblique slit in a sleeve in a manner to cause the sleeve to execute a stepwise rotation with each stroke of the piston. This stepping mechanism drives cams which actuate control valves to control the actuation signals for the lubricating device. This known monitoring device is relatively expensive. Moreover, the setting and varying of the number of switch-on periods which are to take place until a lubricating signal is actuated are complicated and can be effected only within limits.

SUMMARY OF THE INVENTION

It is therefore an object of the present invention to enable such a monitoring device to be manufactured at low cost and with small dimensions.

Another object of the invention is to permit the number of switch-on periods required before a lubricating signal is actuated to be easily adjusted over wide limits.

These and other objects according to the invention are achieved by arranging the drive piston to drive a reciprocating pump to convey the lubricant, by providing such pump with a line, or conduit, opening into a cylinder chamber in which an actuating piston is arranged to be displaceable in steps over a path of movement, and by disposing in the path of movement, an actuating device which acts on the control valve.

Thus, there is provided a hydropneumatic counting member which has but a few simple components, can be manufactured with small dimensions, and is dependable in operation. Moreover, the number of switch-on periods required until a lubricating signal is actuated can be varied in various ways, i.e. by adjusting the quantity of lubricant conveyed by the reciprocating pump, by selecting the diameter of the actuating piston or the volume of the cylinder chamber in which the piston is displaced, and finally by adjusting the stroke of the actuating piston, for example by the installation of pistons of various lengths which simultaneously changes the moment at which the piston abuts on the actuating device of the control valve. Thus, several actuating pistons of different lengths, any one of which can be interchangeably installed, could be provided with the device. In practice, this permits the realization of a setting range from a few switch-on periods to about one thousand switch-on periods for each lubricating signal.

According to a preferred embodiment of the invention, the drive piston and the reciprocating pump driven thereby are constituted by a known oil injector capable of delivering a variable discharge quantity, which is available as a lubricating device without additional cost and which can be combined in a simple manner with the other components of the apparatus according to the invention.

According to a further feature of the invention, the control valve can be provided with a locking element in the form of a differential piston with a locking spring and the piston will be urged in its opening direction by the compressed air directed to the devices to be lubricated. This assures a sudden switching movement of the control valve as soon as such movement is actuated by the actuating piston.

If, according to a further embodiment of the invention, a reset line opens into the area in front of the actuating piston, which area is disposed at the opposite side of the actuating piston from the cylinder chamber supplied with the conveyed lubricant, and this reset line branches off behind the control valve, with respect to the direction of fluid flow, from the line controlled by the control valve, the control valve will also control the resetting of the actuating piston into its starting position. Advantageously the cylinder chamber supplied with the conveyed lubricant is here in communication via a spring-tensioned check valve, with the lubricant supply line of the reciprocating pump. The actuating piston is then pushed back into its starting position immediately after opening of the control valve by the pulse of compressed air flowing through the control valve so that the lubricant flows back from the cylinder chamber through the check valve to the reciprocating pump.

The actuating piston can also be reset, according to an another feature of the invention, by providing the actuating piston with a reset spring and bringing the cylinder chamber which is supplied with the conveyed lubricant in communication with the lubricant supply line of the reciprocating pump via a spring-tensioned check valve with a differential piston. The check valve with the differential piston and its locking spring are here dimensioned so that the check valve will not open until the actuating piston has reached its end position and thus the pressure in the cylinder chamber will rise due to the continued delivery of lubricant by the reciprocating pump. As a result of the differential piston, the check valve remains open until the reset spring has returned the actuating piston into its starting position.

Further details and advantages of the invention will become evident from the following description of two embodiments which are shown in the drawings.

BRIEF DESCRIPTION OF THE DRAWING

FIG. 2 is a simplified longitudinal cross-sectional view of a preferred practical embodiment of an apparatus according to the present invention.

DESCRIPTION OF THE PREFERRED EMBODIMENTS

Figure 1:
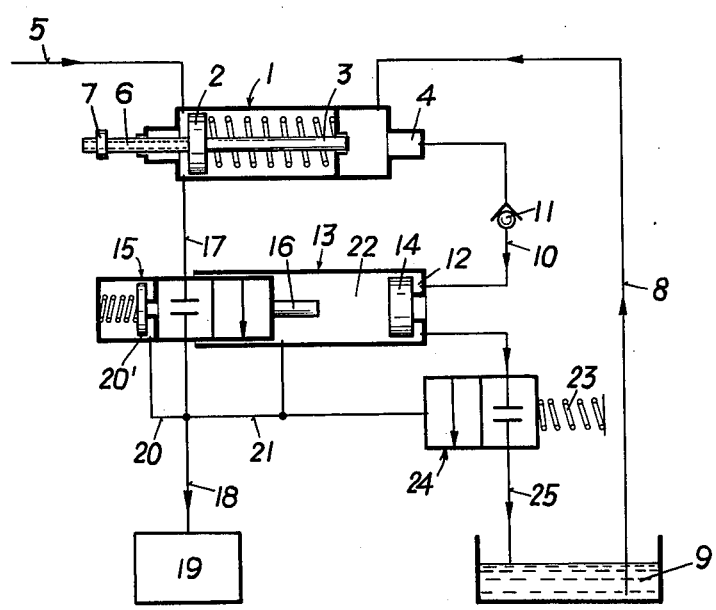
FIG. 1 is a schematic block circuit diagram of one preferred embodiment of an apparatus according to the invention.

In the embodiment shown in FIG. 1, a reciprocating pump 1 is provided with a drive piston 2, a pump plunger 3 and a pump cylinder 4. The drive piston 2 is actuated by pulses of compressed air introduced through a line 5. A rod 6 is fastened onto drive piston 2 and carries a nut 7 which abuts at the pump housing when the piston is at the end of its delivery stroke and which permits setting of the piston stroke. A line 8 is provided to supply the lubricant to be conveyed to the reciprocating pump 1 from a lubricant tank, or reservoir, 9.

The delivery line 10 of reciprocating pump 1, which contains a check valve 11, leads to the cylinder chamber 12 of a cylinder 13 in which an actuating piston 14 is arranged to be freely displaceable while being, in accordance with standard practice, in sealing engagement with the lateral wall of chamber 12. Cylinder 13 is followed by a control valve 15 which has its actuating rod 16 disposed in the path of movement of actuating piston 14. The system is designed so that any air present in chamber 22 between piston 14 and rod 16 will not, during movement of the piston 14 to the left, develop sufficient pressure to itself move valve 15. Valve 15 will be moved only when contacted by piston 14.

Control valve 15 controls air flow through a line 17 for compressed air which leads from reciprocating piston 1 and is in permanent communication with the compressed air line 5 leading to reciprocating pump 1. On the other side of control valve 15 an air pulse line 18 leads to a schematically indicated lubricating device 19, which may be a known metering element, for example, or an oil gun, or oil injector. From pulse line 18 a branch 20 leads to a spring-tensioned holding piston 20' mounted in an auxiliary cylinder of valve 15 and arranged to keep control valve 15 open after it has been opened by the action of piston 14 and as long as a pulse of compressed air is present in line 17. Furthermore, a reset line 21 branches off from pulse line 18 and itself branches out and leads, on the one hand, to chamber 22 of cylinder 13 in front of actuating piston 14 and, on the other hand, to an air-operated two-way valve 24 biassed into its closed state charged by a spring 23. Valve 24 controls flow through a line 25 which leads from cylinder chamber 12 back to lubricant tank 9.

FIG. 2 shows an embodiment in which all components are combined into a compact unit. The reciprocating pump 1 is here an oil gun, or oil injector, which is known per se for the lubrication of pneumatic devices and which includes a drive piston 2, a pump plunger 3 and a pump cylinder 4. Rod 6 is screwed into piston 2 so as to permit variation of the penetration depth of pump plunger 3 into pump cylinder 4 and thus to permit adjustment of the quantity of lubricant conveyed by the pump. By rotating rod 6, the axial position of plunger 3 relative to piston 2 can be changed and since the stroke of piston 2 is, in this embodiment, fixed, the result will be to adjust the depth to which plunger 3 penetrates into cylinder 4 by the end of the stroke of piston 2.

Check valve 11 is directly attached to pump cylinder 4 and leads to conveying line 10 which passes through a channel 26 in a check valve 24' and leads into chamber 12 of cylinder 13. Control valve 15 is urged into its closed state by a reset spring 27 and is closed by a differential piston 29 which is displaceable in a cylinder 28. The portion of differential piston 29 which has the smaller cross section cooperates with a valve seat 30 to define a normally closed passage. When this passage is open, it brings compressed air line 17 into communication with pulse line 18 and with the reset line 21 which is provided in the form of a channel in cylinder 13. Reset valve 24' in this embodiment is also directly attached to cylinder 13 and controls the communication between cylinder chamber 12 and line 25 which leads back to the lubricant tank. In this embodiment, the entire unit is arranged relative to the reservoir 9 so that the transverse passage between, and including, lines 8 and 25 will always remain filled with lubricant.

In both embodiments the mode of operation of the apparatus is substantially the same and will be explained initially with specific reference to FIG. 1. If a pulse of compressed air is introduced through line 5 to reciprocating pump 1, this pulse will displace drive piston 2 to the right so that pump plunger 3 enters into pump cylinder 4 and forces a certain quantity of lubricant into conveying line 10. The conveyed quantity can be set by appropriately positioning nut 7 along the length of rod 6. The lubricant travels via check valve 11 and line 10 to a cylinder chamber 12 where it effects a stepwise unidirectional displacement of actuating piston 14 to the left. After a number of such stepwise displacements, actuating piston 14 abuts on the actuating rod 16 of control valve 15 and opens the control valve, causing the then occurring pulse of compressed air introduced through line 5 to pass through compressed air line 17 and control valve 15 to pulse line 18 and finally to lubricating device 19. This actuates lubricating device 19 and actuates a lubricating process.

At the same time compressed air enters chamber 22 in front of actuating piston 14 through reset line 21 and reaches two-way valve 24 which is thus opened against the force of its spring 23. Thus, in one stroke the pressure building up in chamber 22 pushes actuating piston 14 to the right to its final, or starting, abutment so that the lubricating oil is pressed out of cylinder chamber 12 through line 25 and the open two-way valve 24 back into lubricant reservoir 9. However, valve 15 is held open by the action of piston 20' as long as an air pressure pulse is present in line 5. As soon as the pressure pulse ends so that the pressure in line 5 drops, the air under pressure also escapes from pulse line 18 and from lines 20 and 21 branching off therefrom until the control valve closes and thus the apparatus has returned to its starting state.

In the embodiment of FIG. 2, the differential piston 29 is provided as the closing element of control valve 15 and assures that the passage between piston 29 and valve seat 30, and thus the connection between compressed air line 17 and pulse line 18, will open in an abrupt manner so that no faulty control action can take place. Furthermore, differential piston 29, whose entire piston surface is acted on by the pressure in line 17 when control valve 15 is open, will keep the control valve open until after the pressure in line 5 drops so that complete resetting of actuating piston 14 into its starting position and thus completion of the lubricating process are assured.

The number of pressure pulses which must be supplied through line 5 to actuate a respective lubricating pulse in line 18 can be varied in different ways. The penetration depth of pump plunger 3 into pump cylinder 4, and thus the quantity of lubricant conveyed with every stroke of drive piston 2, can be varied with the aid of rod 6. If a relatively small quantity is conveyed by each pump stroke, a correspondingly greater number of conveying strokes are required to fill the volume of cylinder chamber 12 and push actuating piston 14 into its other end position than if a greater quantity is conveyed by reciprocating pump 1. In practice this permits an adjustment at a ratio of about 1:10. A further possibility for adjustment can be provided by having a number of actuating pistons 14 of different axial lengths available for interchangeable installation in cylinder 13. Alternatively, the length of actuating rod 16 can be varied, either by constructing a single rod to have an adjustable effective length or by providing interchangeable rods of different lengths. Thus it is possible to vary the number of conveying strokes of reciprocating pump 1 required to produce a single lubricating pulse in pulse line 18 approximately up to a ratio of 1:1000.

According to one modification of the illustrated and described embodiment, reciprocating pump 1 can also be actuated manually or via a simple mechanical cam system, and also possibly by electrical control pulses. According to another alternative, reciprocating pump 1 may convey a fluid other than lubricating oil to transfer the driving pulses provided to the reciprocating pump to actuating piston 14. Finally, in addition to lubricating devices, the control device according to the present invention can also be used quite generally as a counting member for other pulse control applications.

It will be understood that the above description of the present invention is susceptible to various modifications, changes and adaptations, and the same are intended to be comprehended within the meaning and range of equivalents of the appended claims.

What is claimed is:

1. In apparatus for controlling the delivery of pulses of compressed gas from a source of such pulses to a device which is to be actuated by such pulses, which apparatus includes a drive piston disposed in a cylinder to undergo reciprocating movement therein, a normally closed control valve disposed in a fluid conducting line arranged to be connected between such source and such device, opening of the valve, placing the source in pressure-transmitting communication with the device, and a stepping mechanism connected between the drive piston and the control valve to effect opening of the control valve in response to the reciprocating movements of the drive piston, the improvement wherein said stepping mechanism comprises: a reciprocating pump connected to be driven by said drive piston and having an input receiving a supply of liquid and a liquid output, said pump constituting means for conveying from its output a predetermined quantity of liquid upon each cycle of reciprocating movement of said drive piston; means defining an actuating cylinder containing an actuating piston and defining a first cylinder chamber provided with a liquid input connected to receive the quantities of liquid conveyed from said pump output for causing said actuating piston to undergo a unidirectional stepwise movement in said actuating cylinder in response to receipt of each quantity of liquid from said pump outlet; and actuating means operatively connected to said control valve and disposed in the path of movement of said actuating piston for opening said control valve in response to arrival of said actuating piston at a selected location along the length of said actuating cylinder.

2. An arrangement as defined in claim 1 wherein the gas is air, the liquid is a lubricant, the device is a lubricating device for lubricating a moving system, and said drive piston is arranged to undergo such reciprocating movement in synchronism with the moving system.

3. An arrangement as defined in claim 2 wherein said drive piston and said reciprocating pump are constituted by an oil injector containing means for adjusting the value of the quantity of lubricant conveyed from said pump output upon each cycle of reciprocating movement of said drive piston.

4. An arrangement as defined in claim 3 wherein said control valve comprises: a differential piston defining a valve body; and a reset spring connected to urge said valve body in a direction to block flow through said fluid conducting line; said differential piston presenting a surface which is exposed to air in said line only after said control valve is open, for holding said valve open as long as a pulse of compressed air is present in the line.

5. An arrangement as defined in claim 4 wherein said actuating cylinder defines a second cylinder chamber located at the opposite side of said actuating piston from said first cylinder chamber and isolated from said first cylinder chamber by said actuating piston, and said arrangement further comprises means defining a fluid-conducting path placing said second cylinder chamber in communication with the portion of said fluid conducting line disposed between said control valve and such device.

6. An arrangement as defined in claim 5 further comprising a first spring-biassed check valve connected in the liquid path between said pump input and said first cylinder chamber in a manner to permit liquid flow only in the direction from said pump outlet to said first cylinder chamber.

7. An arrangement as defined in claim 4 further comprising means defining a liquid flow path between said first cylinder chamber and said pump input, and a second spring-biassed check valve disposed in said liquid flow path for permitting flow of liquid only in the direction from said first cylinder chamber to said pump inlet.

8. An arrangement as defined in claim 3 wherein said actuating cylinder defines a second cylinder chamber located at the opposite side of said actuating piston from said first cylinder chamber and isolated from said first cylinder chamber by said actuating piston, and said arrangement further comprises means defining a fluid-conducting path placing said second cylinder chamber in communication with the portion of said fluid conducting line disposed between said control valve and such device.

9. An arrangement as defined in claim 8 further comprising a first spring-biassed check valve connected in the liquid path between said pump input and said first cylinder chamber in a manner to permit liquid flow only in the direction from said pump outlet to said first cylinder chamber.

10. An arrangement as defined in claim 3 further comprising means defining a liquid flow path between said first cylinder chamber and said pump input, and a second spring-biassed check valve disposed in said liquid flow path for permitting flow of liquid only in the direction from said first cylinder chamber to said pump inlet.

11. An arrangement as defined in claim 2 wherein said actuating cylinder defines a second cylinder chamber located at the opposite side of said actuating piston from said first cylinder chamber and isolated from said first cylinder chamber by said actuating piston, and said arrangement further comprises means defining a fluid-conducting path placing said second cylinder chamber in communication with the portion of said fluid conducting line disposed between said control valve and such device.

12. An arrangement as defined in claim 11 further comprising a first spring-biassed check valve connected in the liquid path between said pump input and said first cylinder chamber in a manner to permit liquid flow only in the direction from said pump outlet to said first cylinder chamber.

13. An arrangement as defined in claim 2 further comprising means defining a liquid flow path between said first cylinder chamber and said pump input, and a second spring-biassed check valve disposed in said liquid flow path for permitting flow of liquid only in the direction from said first cylinder chamber to said pump inlet.

14. An arrangement as defined in claim 2 wherein said control valve comprises: a differential piston defining a valve body; and a reset spring connected to urge said valve body in a direction to block flow through said fluid conducting line; siad differential piston presenting a surface which is exposed to air in said line only after said control valve is open, for holding said valve open as long as a pulse of compressed air is present in the line.

* * * * *